United States Patent
Mallen-Herrero et al.

(10) Patent No.: US 6,192,941 B1
(45) Date of Patent: Feb. 27, 2001

(54) FLEXIBLE TUBULAR PIPE COMPRISING AN INTERLOCKED ARMOURING WEB

(75) Inventors: José Mallen-Herrero, Paris; Pascal Estrier, Saint-Wandrille-Rancon; Anne Vincent, Duclair, all of (FR)

(73) Assignee: Coflexip (FR)

( * ) Notice: Subject to any disclaimer, the term of this patent is extended or adjusted under 35 U.S.C. 154(b) by 0 days.

(21) Appl. No.: 08/849,654

(22) PCT Filed: May 5, 1995

(86) PCT No.: PCT/FR96/01601

§ 371 Date: Apr. 26, 1999

§ 102(e) Date: Apr. 26, 1999

(87) PCT Pub. No.: WO96/18060

PCT Pub. Date: Jun. 13, 1996

(30) Foreign Application Priority Data

Dec. 5, 1994 (FR) .................................................. 94 14600

(51) Int. Cl.[7] ...................................................... F16L 11/16
(52) U.S. Cl. ............................ 138/135; 138/138; 138/150
(58) Field of Search .................................. 138/135, 127, 138/130, 138, 150, 154

(56) References Cited

U.S. PATENT DOCUMENTS

| 1,055,263 | * | 3/1913 | Fischer | 138/135 |
|---|---|---|---|---|
| 3,908,703 | * | 9/1975 | Bournazel et al. | 138/137 |
| 4,549,581 | * | 10/1985 | Unno et al. | 138/129 |
| 5,275,209 | * | 1/1994 | Sugier et al. | 138/135 |
| 5,307,842 | * | 5/1994 | Lequeux | 138/130 |
| 5,645,109 | * | 7/1997 | Herrero et al. | 138/130 |
| 5,813,439 | * | 9/1998 | Herrero et al. | 138/135 |
| 6,006,788 | * | 12/1999 | Jung et al. | 138/135 |
| 6,065,501 | * | 5/2000 | Feret et al. | 138/133 |

FOREIGN PATENT DOCUMENTS

| 4303508 | | 3/1994 | (DE) . | |
|---|---|---|---|---|
| 1346924 | * | 2/1963 | (FR) . | |
| 1483914 | | 4/1966 | (FR) . | |
| 2217621 | | 2/1973 | (FR) . | |
| 2561745 | | 3/1984 | (FR) . | |
| 1081339 | * | 8/1967 | (GB) | 138/135 |
| 9100467 | | 1/1991 | (WO) . | |
| 9200481 | * | 1/1992 | (WO) . | |

* cited by examiner

Primary Examiner—James Hook
(74) Attorney, Agent, or Firm—Ostrolenk, Faber, Gerb & Soffen, LLP

(57) ABSTRACT

A flexible tubular hose, in particular for transporting fluids under pressure, comprising pressure-resistant armoring constituted by winding at least one pair of interlockable metal section wires, one of which has a T-section and the other of which has a U-section, the ribs of the T-section wire being directed toward the outside of the flexible tubular hose and the ribs of the U-section wire being directed toward the axis of the flexible tubular hose. The area of the cross section of the T-section wire (3) is substantially greater than the area of the cross section of the U-section wire (4), and in each lateral interlock zone constituted on the one hand by a lateral rib (13) of the U-section wire (4) engaged in a lateral groove of the T-section wire (3), and on the other hand by a lateral rib (9) of the T-section wire facing the base portion (12) of the U-section wire between the two ribs (13) of this U-section wire, there is both contact between the lateral rib of a first of the two section wires and the second section wire, and radial clearance between the lateral rib of the second section wire and the first section wire.

7 Claims, 3 Drawing Sheets

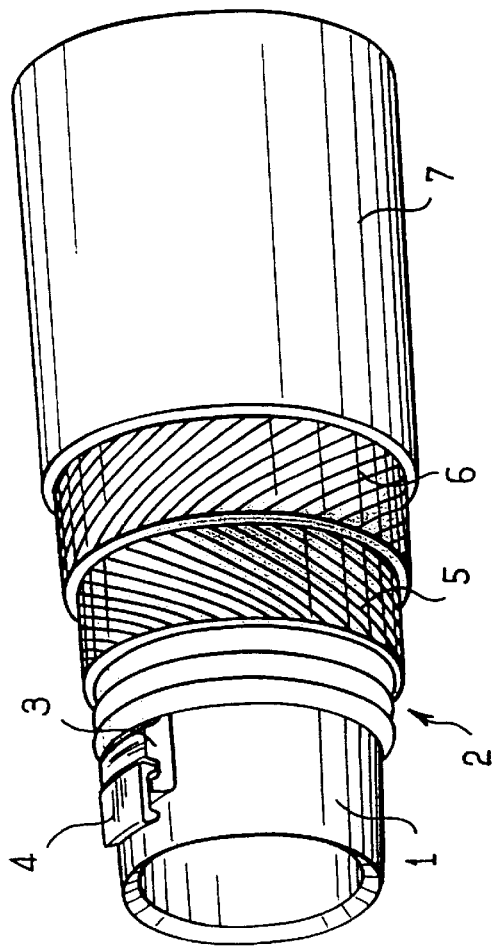
FIG_1
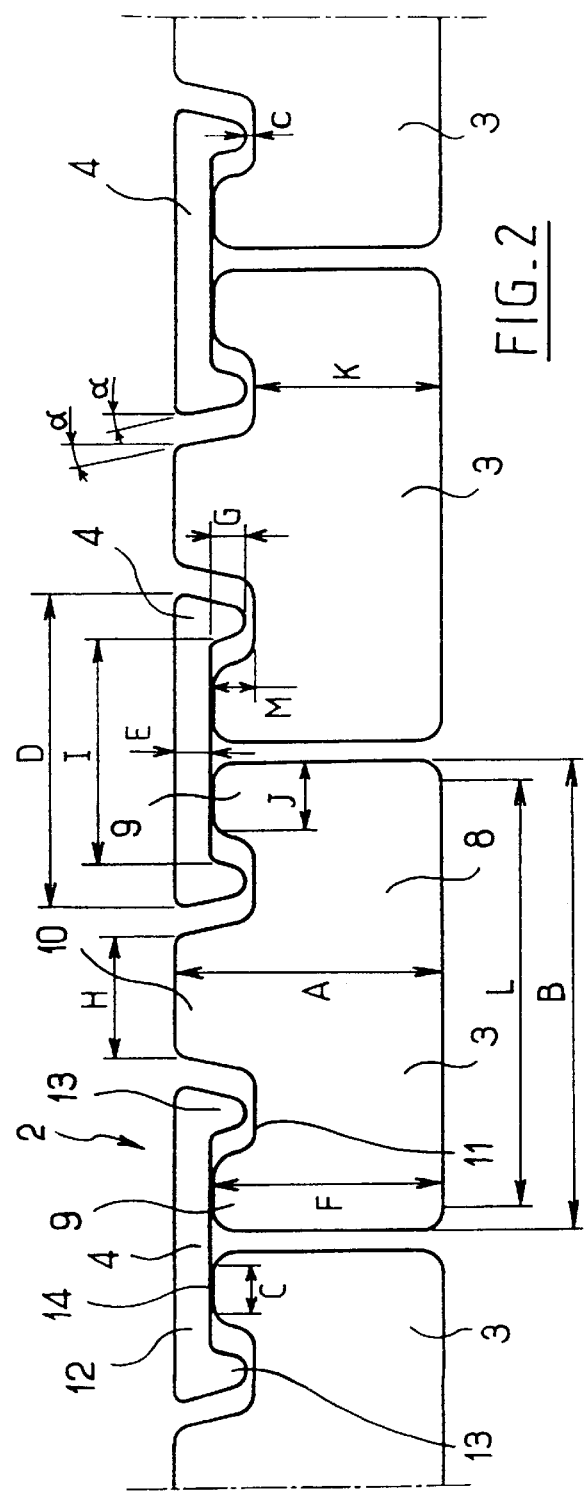
FIG.2

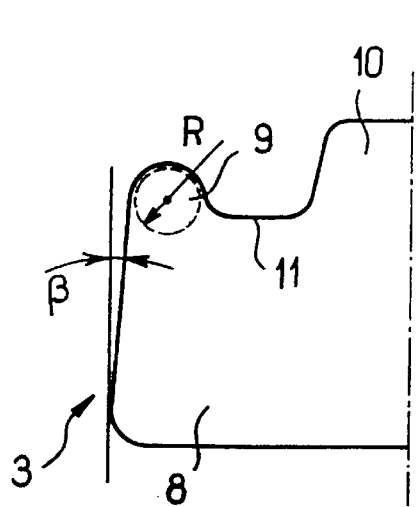
FIG_3
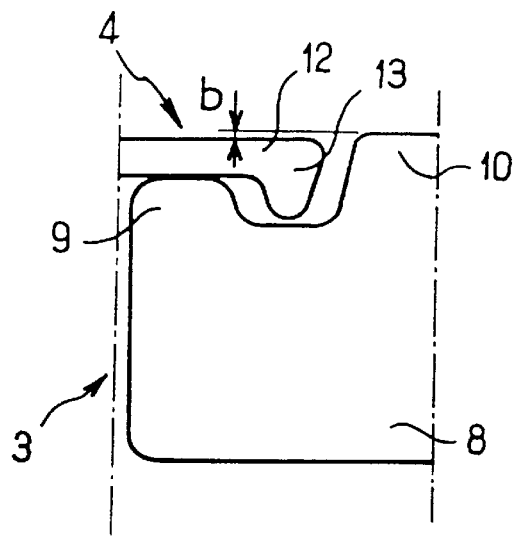
FIG_4
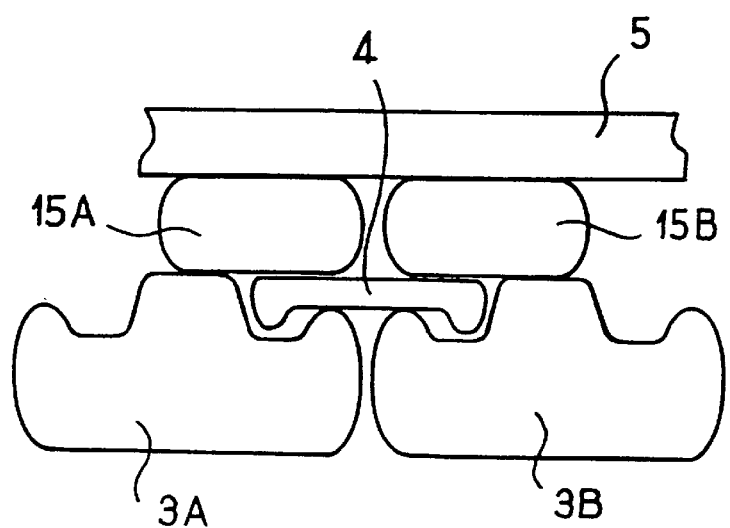
FIG_5A

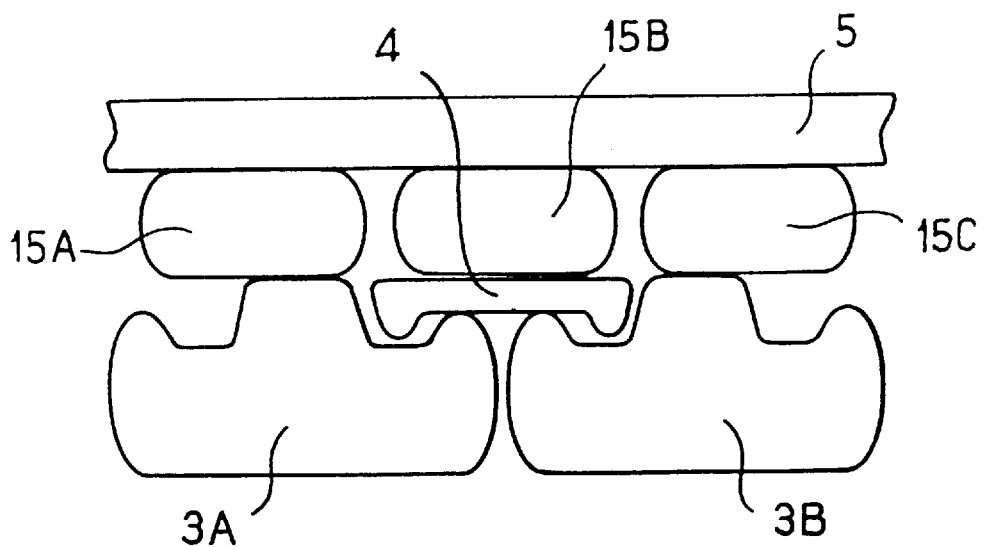
FIG_5B
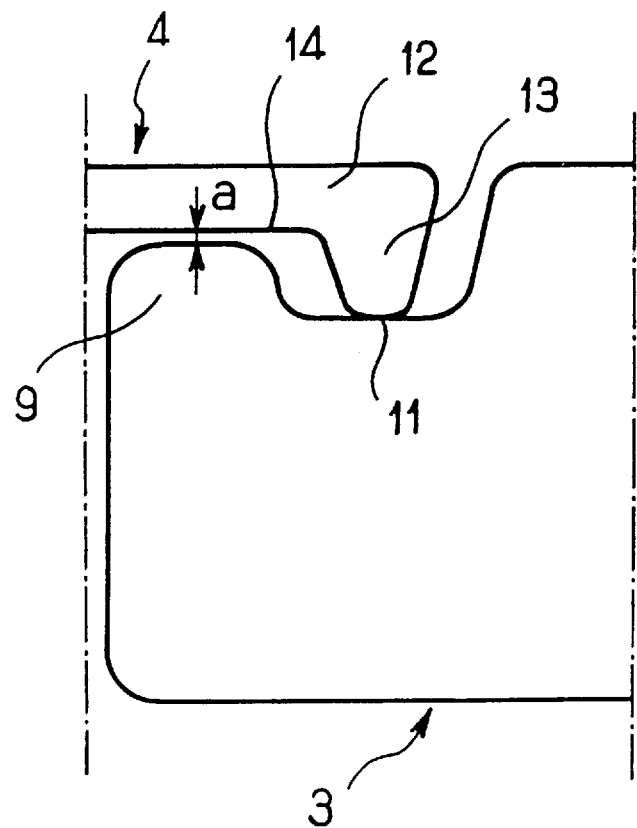
FIG_6

FLEXIBLE TUBULAR PIPE COMPRISING AN INTERLOCKED ARMOURING WEB

BACKGROUND OF THE INVENTION

The present invention relates to a flexible hose suitable for use in particular for transporting fluids under pressure, especially hydrocarbons produced by operating a subsea well.

The Applicant company manufactures and sells great lengths of various types of such hoses, having high mechanical qualities, in particular tensile strength, and resistance to crushing, to the internal pressure of the fluid being transported, and to the effects of twisting.

Thus, the Applicant company manufactures and sells hoses designed to withstand high pressures, greater than 100 bars and possibly as great as 500 bars to 1000 bars, and comprising an internal leakproof sheath, so-called "tension" armoring constituted by at least two crossed layers of wires of simple shape in section, generally rectangular or circular and, between the internal leakproof sheath and the tension armoring, a pressure-resistant armoring referred to as a pressure arch, and comprising one or more layers of metal wires that are spiral-wound at an angle that is close to 90° relative to the axis of the flexible hose, the tension armoring being covered by an outer protective sheath.

In practice, the angle at which the pressure arch is spiral-wound is greater than 80° relative to the axis of the flexible hose so as to give the arch maximum strength against the circumferential component (hoop stress) of the forces generated by the pressure inside the hose.

Various configurations for such pressure arches have already been described, in particular in document WO-91/00467.

That prior document discloses, in particular, a pressure arch configuration constituted by a helical winding of at least one pair of interlockable metal section wires, one of the section wires having a so-called "T-shaped" section, the other section wire having a so-called "U-shaped" section, the wires being organized and dimensioned so that on being wound they provide lateral interlocking of the turns, i.e. limitation of the extent to which the turns can move apart laterally in the direction of the axis of the flexible tubular hose.

A T-section wire can be defined as having a base portion provided at its lateral extremities with ribs projecting from the base portion, and the section also has a central rib projecting from the base portion with the end thereof being located at a greater distance from the base portion than are the ends of the lateral ribs.

The U-section wire comprises a base portion provided at its lateral extremities with ribs that project from the base portion.

In the configurations known from the above-mentioned prior document in which the pressure layer is made by spiral-winding and interlocking section wires where one has a T-shaped section and the other has a U-shaped section, the U-section wire is large in thickness and in section.

According to that prior document, the U-section wire can be disposed either with its ribs facing outward or else with its ribs facing inward.

As a result of experimental work, the Applicant company has found on the one hand that in dynamic applications, i.e. when the flexible hose is subjected to alternating bending deformation, such a flexible hose presents very disappointing performance if it has a pressure layer constituted by an inner layer of U-section wire and an outer layer of T-section wire, so that the U-section wire has ribs that are outwardly directed. It has been observed that, in practice, once the hose is in the assembled state, there always exists contact between the T- and U-section wires constituting the pressure layer and that this continues throughout the time the hose is in use, with the mutual thrust forces between the projecting portions of the section wires being large.

It has been observed that, in use, the friction generated by such contact, associated with the large thrust forces, gives rise to a reduction in lifetime due to cracking phenomena that appear in the section wires and due to the reduction of the section thereof.

On deciding to make the inner layer out of T-section wire with the ribs of the U-section wire being inwardly directed, it has been found that, in practice, it is not possible to prevent radial contact taking place between the T-section wire and the U-section wire, and that the U-section wire contributes significantly to the resistance to the circumferential component of the pressure forces. Under such conditions, the bearing forces between the T-section wire and the U-section wire run the risk of remaining excessively great.

A first prototype was made with the ribs of the U-section wire directed inwardly and with modified dimensional characteristics of the T- and U-section wires. Fatigue testing on the prototype under dynamic conditions and under pressure terminated prematurely because the U-section wire broke.

The present invention relies, in particular, on the discovery, made during the investigation subsequent to this breaking of the U-section wire, that the U-section wire is subjected to greater or lesser bending moments caused by the friction forces which are associated with the radial forces between the T-section wire and the U-section wire.

SUMMARY OF THE INVENTION

The present invention proposes to provide a flexible hose that includes a pressure arch with a T-section wire and a U-section wire which in particular does not present the drawbacks of known structures of the same type.

According to the present invention, provision is made for the ribs of the T-section wire to be directed outward from the flexible hose, the ribs of the U-section wire being directed toward the axis of the flexible hose, for the area of the cross section of the T-section wire to be substantially greater than the area of the cross section of the U-section wire, and, in each lateral interlock zone constituted on the one hand by a lateral rib of the U-section wire engaged in a lateral groove of the T-section wire, and on the other hand by a lateral rib of the T-section wire facing the base portion of the U-section wire and between the two ribs of this U-section wire, for there to be both contact between the lateral rib of a first of the two section wires and the second section wire, and radial clearance between the lateral rib of the second section wire and the first section wire.

Preferably, said first section wire is the T-section wire, the two lateral ribs of this section wire being in contact with the facing surface of the base portion of the U-section wire which constitutes the preferably flat, wide bottom of the groove situated between the lateral ribs of this U-section wire, and the two lateral ribs of the U-section wire being distant from the corresponding grooves of the T-section wire, with a certain amount of radial clearance.

The ratio of said areas of the cross sections of the T- and U-section wires, respectively, is advantageously greater than or equal to 2 and preferably greater than or equal to 3. In the advantageous case of steel wires, particularly beneficial results have been obtained with a ratio lying between 4 and 5 and with a total thickness of the T-section wire lying between 12 mm and about 18 mm corresponding to typical applications.

The thickness of the T-section wire may be smaller, but it is preferably greater than or equal to 5 mm. In this case, the thickness of the U-section wire is reduced to the minimum, while nevertheless preferably remaining not less than 1 mm.

For greater wire thicknesses, it is beneficial to keep the thickness of the base portion of the U-section wire to a value that is relatively small, e.g. of the order of 1.5 mm to 3 mm, so that the ratio of said areas can exceed the above-mentioned value of 5.

Because of the respective disposition provided according to the invention for the T- and U-section wires, this characteristic is advantageous insofar as it is the T-section wire which is called on to withstand the major share of the circumferential component of the forces generated by the pressure inside the hose.

The geometrical configuration of the T-section wire and of the U-section wire is such that, viewed in cross section, they present inboard and outboard circumferential outside surfaces that are substantially parallel to the axis of the flexible hose. That is to say, in a longitudinal cut through the pressure arch, the inner base of the T-section wire and the outer edge of its central rib, and also the outer face of the U-section wire and the inner face thereof constituting a wide groove between the ribs, are in the form of a straight line parallel to the axis of the flexible hose.

Since the flexible hose is made in such a way that the two lateral ribs of a first wire, preferably the T-section wire, are in contact with the corresponding groove of the second section wire, preferably the inner base of the U-section wire, there exists initial radial clearance that is equal in practice to not less than 0.1 mm between the lateral ribs of the second section wire and the corresponding groove of the first section wire. This initial radial clearance is preferably greater than or equal to 0.2 mm, and in common practice may be of the order of 3% to 5% of the thickness of the T-section wire.

Under such conditions, when the flexible hose is put into service and is filled with fluid under pressure, the resistance offered by the pressure arch to the circumferential component of the forces due to the pressure, taking account of the role played by the tension armoring, is shared between the T-section wire and the U-section wire. When the materials of the section wires have the same Young's modulus, the circumferential component is shared approximately as a function of the respective areas of the cross sections of the two section wires. As a result, in the initial situation of the flexible hose being put into service, there exists a radial bearing force between the ribs of the first section wire and the facing grooves of the second section wire. When the flexible hose is used under dynamic conditions, the curvature of the hose varying over time, normally at the period of the swell, there results a relative displacement between the two section wires, in the lateral direction of the wires, i.e. in the axial direction of the flexible hose. The radial bearing force thus gives rise to a state of alternating stresses of relatively low level that combine with the static tensile stress directed lengthwise in the wire and of relatively high value corresponding to resistance to the circumferential component of the pressure. It is not obvious, a priori, that the fatigue state created in this way is compatible with the lifetime required in the intended applications, e.g. 20 years. Also, the bearing force generates friction and causes progressive wear of the surface of one or both of the wires in contact.

According to the present invention, the surface area of the cross section of the T-section wire is larger, and preferably several times greater than that of the U-section wire. As a result, the portion of the circumferential force taken up by the U-section wire and the radial bearing force are relatively reduced, as a function of the ratio of the cross sections of the two wires.

The progressive wear of the surfaces of the two mutually bearing wires causes the winding radius of the T-section wire to increase slightly and causes the winding radius of the U-section wire to reduce slightly, while at the same time causing the inertial axes of the two wires to move toward each other.

As the wires wear, it has thus been found that the portion of the circumferential force taken up by the T-section wire increases progressively, the contribution of the U-section wire decreasing proportionally more quickly and, in numerous cases, possibly being replaced after a certain time by a small compressive force. Correspondingly, the radial bearing force between the wires decreases at the same time as the circumferential force in the U-section wire. The discovery of this favorable property has played an essential role in evaluating the advantages procured by the invention.

Another consequence of the wear on contact between the rib of the first section wire and the corresponding groove of the second section wire is that, compared with its initial value, the radial clearance between the rib of the second section wire, preferably the U-section wire, and the groove of the second section wire, decreases progressively.

According to the present invention, this radial clearance, i.e. the radial clearance of the second rib, must remain throughout the entire time the flexible hose is in use. It has been found that if, because of initial clearance that is insufficient compared with the possible amount of wear, a second radial bearing zone appears after a certain time between the rib of the second wire and the corresponding groove of the first wire, then this gives rise rapidly to breakages in the U-section wire. This has been attributed to a combination on the one hand of the situation in which the U-section wire then finds itself in four-point bearing against the two adjacent turns of the T-section wire, the two ribs of the U-section wire and a lateral rib of each of the two T-section wires being in bearing contact, and on the other hand of the existence of a bending moment in the U-section wire which has been discovered elsewhere and which is attributed to the alternating transverse compressive/tensile stresses created in the inner wall and at the extremity of the rib of the U-section wire by the friction forces at the contact with the facing surfaces of the T-section wire. However, when the initial value of the radial clearance of the second rib is sufficient for this radial clearance to remain without bearing support throughout the lifetime of the flexible hose, it has been found that the U-section wire is not subject to breakage.

In a first embodiment, the characteristics of the T-section wire and of the U-section wire are selected so that the flexible hose has two successive operating stages.

During a first stage in which there exists contact with bearing force between the T-section wire and the U-section wire, a portion of the circumferential forces is taken up by the U-section wire with contact pressure between the two section wires.

This contact gives rise to friction and to the onset of wear which occurs for as long as a certain amount of bearing force exists between the T- and U-section wires, in spite of an onset reduction in thickness in one or other of the mutually bearing spans.

Work performed by the Applicant company has shown that, given the variation in the stresses and the deformations associated with dynamic effects, essentially the action of swell, the wear reaches a final and maximum amplitude that is small, being of the order of a few tenths of a millimeter. Given the dimensions of the section wires and in particular of the T-section wire which is of large section, the resulting reduction in the area of the section is extremely small and in fact negligible in practice.

During a second operating stage, the T-section wire and the U-section wire remain approximately in contact, but the bearing force becomes extremely small, and even practically negligible. More precisely, the bearing force remains equal to the level below which there can be no further wear.

The section wires are thus no longer subject to wear and a considerable increase in lifetime is observed as compared with previously known structures, including those in which a T-section wire is associated with a U-section wire.

According to the invention, since the section of the wires is stabilized at a value very close to its initial value, and since the bearing forces between the section wires disappear after a thin surface film has been evenly eroded, it can be observed that the pressure arch shows no onset of cracking.

In a second embodiment, although the bearing force decreases continuously, it remains sufficient for wear to continue throughout the lifetime of the flexible hose, with the rate of wear decreasing at the same time as the bearing force, and thus becoming smaller and smaller. It has been found that the final wear is small, as in the first embodiment, and is likewise a few tenths of a millimeter, so that, in particular, the radial clearance of the second rib remains without bearing contact, even when the wear, in the case of thick wires, reaches about one millimeter.

Outside the pressure arch constituted by the T- and U-section wires, there is the tension armoring, an intermediate layer of polymeric material optionally and advantageously being disposed between the arch and the armoring. In conventional manner, the tension armoring exerts a compressive force on the underlying arch, and that force must be taken into account when evaluating the forces applied to the T- and U-section wires, and also the bearing forces between the T-section wire and the U-section wire.

The T- and U-section wires are preferably dimensioned in such a manner that, when in the wound state, each section wire has two bearing points on the wire of complementary shape, and each turn of the wire thus bears in a simply supported manner on each of the two adjacent turns, the cylindrical outer surface of the U-section wire having a diameter that is equal to or slightly less than that of the T-section wire.

The pressure arch of the invention can, where appropriate, be supplemented with a supplementary pressure arch placed thereon and constituted by a non-interlocking wire that is spiral-wound at a large angle, with the tension armoring being disposed outside this supplementary arch. Preferably, the non-interlocking wire is of rectangular section with rounded corners, and is spiral-wound in the opposite direction to the section wires of the pressure arch, the outer surface of the U-section wire being slightly set back from the end face of the central rib of the T-section wire. An intermediate plastics sheath may optionally be disposed between the pressure arch and the supplementary arch of non-interlocking wires.

The present invention is applicable to making "smooth bore" type flexible tubular hoses, i.e. in which the inner leakproof sheath is the innermost element of the hose in contact with which the fluid to be transported circulates, and "rough bore" type hoses which include, inside the leakproof sheath, a flexible metal lining such as a structure of the interlocking metal strip type.

The present invention has remarkable advantages:

1) Mechanical performance that is considerably better than that of the prior art flexible hoses, in particular in terms of lifetime. The effects of fatigue and of wear are extremely small, and cracking phenomena have disappeared.

2) In severe dynamic applications, the mean stress in the section of the section wire can reach a value that is close to, or in the limit equal to, the allowable stress in a static application, without there being any need to increase the section of the wire and decrease the stress, as can be necessary with prior art wires in order to compensate for the effects of wear, of fatigue, and of stress concentration.

3) The T- and U-section wires are easier to manufacture, without any risk of degrading the metal, in particular because of the forming of the section wires. In addition, taking account of the manufacturing means available in the industry, it is possible in practice to make section wires of greater thickness and sectional area.

4) The operation of manufacturing the hose by spiral-winding the section wires of the pressure arch is made easy. The T-section wire can be spiral-wound in the same manner as the non-interlocking wire of a supplementary pressure arch. This operation is relatively easy, the U-section wire forming the interlocking being laid over the T-section wire under tension, rather like a simple tape.

In the present description, it is indicated that the pressure arch is constituted by a T-section wire and a U-section wire in order to simplify the description. Clearly the pressure arch of the invention could, in conventional manner, and like the supplementary pressure arch, be made up of a plurality of T-section wires arranged in adjacent turns, and a plurality of U-section wires equal in number to the T-section wires. Advantageously, the pressure arch has two T-section wires and two U-section wires, with the spiral-winding pitch being twice that of an arch made up of a single T-section wire and a single U-section wire having the same sectional dimensions. Such a structure makes it possible to double the speed of spiral-winding and to facilitate the balancing of the winding machine, and also to halve the size of the empty space between two adjacent T-section wires.

Other advantages and characteristics of the invention will appear on reading the following description of a non-limiting embodiment given with reference to the accompanying drawing, in which:

BRIEF DESCRIPTION OF THE DRAWINGS

FIG. 1 is a diagrammatic view of an embodiment of a flexible tubular hose of the invention;

FIG. 2 shows an embodiment of the pressure arch of the FIG. 1 hose;

FIGS. 3 and 4 are detail views showing possible configurations of the components of the pressure arch of the flexible tubular hose of the invention; and FIGS. 5A and 5B show variant embodiments with a supplementary pressure arch and FIG. 6 is a detail view of a variant embodiment.

DESCRIPTION OF PREFERRED EMBODIMENTS

The flexible tubular hose shown in FIG. 1 is of the "smooth bore" type and comprises, going from the inside toward the outside, a leakproof sheath of plastics material 1, in particular of polyamide, of fluoropolymer, or of cross-linked polyethylene, a pressure arch 2 whose structure will be described in greater detail below and which is formed by spiral winding two section wires, a T-section wire 3 and a U-section wire 4, tension armoring constituted by two crossed layers of metal wires 5 and 6, and an outside leakproof sheath of plastics material 7. An intermediate sheath (not shown) may optionally be provided between the pressure arch 2 and the first 5 of the layers of the tension armoring.

In a variant (not shown), the arch 2 may comprise two T-section wires and two U-section wires, with the pitch of the helices formed by the section wires then being twice as big.

The invention is not limited to such a "smooth-bore" type hose, and it can be implemented with a "rough-bore" type hose, containing inside the sheath 1 a helically wound interlocking strip metal layer.

Reference is now made to FIG. 2 which shows an embodiment of the pressure arch 2 formed by spiral winding T-section and U-section wires 3 and 4 respectively with non-touching turns.

The T-section wire 3 has a base portion 8 of substantially rectangular section supplemented with two ribs 9 at its lateral extremities and with a central rib 10 of substantially trapezoidal section in its central portion.

Between each of the lateral ribs 9 and the central rib 10 there is formed a groove whose bottom wall is constituted by the surface 11 of the base portion 8.

The section wire 3 is wound in the disposition shown, with the ribs 9 and 10 projecting outward from the flexible tubular hose, i.e. radially away from the longitudinal axis of the hose, not shown in FIG. 2.

The section wire 4 has a base portion 12 with ribs 13 made at the lateral extremities thereof. These ribs 13 point toward the longitudinal axis of the hose.

As can be seen in FIG. 2, the lateral flanks of the central ribs 10 of the T-section wire 3 and the outside flanks of the ribs 13 of the U-section wire 4, are inclined at the same angle $\alpha$ relative to a plane perpendicular to the axis of the flexible tubular hose, this angle $\alpha$ lying in practice between 0° and 30°.

The lateral end flanks of the base portion 8 of the T-section wire 3 may advantageously be perpendicular to the axis of the flexible tubular hose, as shown in FIG. 2, or form an angle $\beta$ therewith, where $\beta$ is less than 10° in practice, as shown in the variant of FIG. 3.

In the cross section of the wire, these lateral flanks may be rectilinear as shown, or where appropriate slightly curved, as shown in FIGS. 5A and 5B.

As shown in particular in FIG. 2, by particular dimensioning, it is possible to ensure that while the pressure arch is being made, contact is provided between the lateral ribs 9 of the T-section wire 3, with the U-section wire 4, and more specifically with the surface 14 of the base portion of this U-section wire which constitutes the wide and preferably flat bottom of the groove formed between the lateral ribs 13 thereof.

As explained above, the bearing forces at the location of the surfaces in contact are called upon to disappear more or less quickly in use. In some cases, when the bearing forces at the beginning of the hose being put into operation are particularly small, it can happen that there is only progressive reduction of the bearing forces, and consequently of the wear rates, without there being any transition to a second stage with extremely low bearing forces that is clearly different from the first stage in which the bearing forces are relatively greater.

In FIG. 2, the following references are used:

A: the height of the T-section 3 as determined by the distance between the lower face of the base portion 8 and the upper end surface of the central rib 10;

B: the width of the T-section 3;

C: the width at the top of the lateral ribs 9 of the T-section 3, assuming that this span is cylindrical, given that in the embodiment shown in FIG. 4 it may be curved, characterized by an osculating circle of radius R;

D: the width of the base portion of the U-section 4;

E: the thickness of the U-section 4, in its central portion constituted by the groove 14;

F: the height of the lateral ribs 9 of the T-section 3, measured from the lower face of its base portion 8;

G: the height of the lateral ribs 13 of the U-section 4, measured from the bottom surface of the groove 14;

H: the width at the top of the central rib of the T-section 3;

I: the width of the bottom surface of the groove 14 of the U-section 4;

J: the width of the lateral ribs 9 of the T-section wire 13;

K: the height of the base portion 8 of the T-section wire 3, i.e. the distance between the lower face of the base portion and the bottom surface 11 of the lateral grooves of the T-section wire, preferably with the ratio of K and A such that K/A is equal to or greater than 0.4, and advantageously equal to or greater than 0.5;

L: the width of the substantially plane central portion of the base surface of the T-section wire 4, directed toward the axis X; and M: the height of the lateral ribs 9 of the T-section wire 3.

c is the gap between the ribs 13 of the U-section wire 4 and the groove bottom surfaces 11 of the T-section wire 3.

This gap constitutes the radial clearance between the lateral ribs of the first wire, here advantageously the T-section wire, and the corresponding groove of the second wire, here the U-section wire, the initial value of this radial clearance being of the order of one or a few tenths of a millimeter.

It is thus possible, by calculation and/or by testing a model or a prototype, to determine for each application the dimensions of the T- and U-section wires, and in particular the gap c, in such a manner that the radial clearance of the first rib, i.e. of the lateral ribs of the first wire, remains throughout the envisaged lifetime.

The thickness of the arch 2 is preferably determined by the thickness A of the T-section wire 3 in its central portion. This value may typically correspond likewise to the sum of the values E and F plus, where appropriate, the distance a in the variant corresponding to FIG. 6, this value being equal to the value A.

FIG. 6 shows the case where the U-section wire is the first wire such that its lateral ribs bear against the corresponding grooves of the T-section wire which constitutes the second wire.

In principle, this variant according to FIG. 6 is less beneficial than the variant according to FIG. 2, insofar as it implies increasing the alternating bending stresses, thereby generating fatigue effects in the U-section wire.

In the variant embodiment shown in FIG. 4, a distance b is provided between the end face of the central rib 10 of the T-section wire 3 and the outside surface of the base portion of the U-section wire 4.

In practice the distance b may be of the order of a few tenths of a millimeter.

The variant shown in FIG. 5 is particularly beneficial when the flexible tubular hose includes, around its pressure arch 2, a layer of non-interlocking wires constituting a supplementary pressure arch.

Such a variant with a supplementary pressure arch, commonly referred to as "banding" is shown in FIGS. 5A and 5B. The wire 15 of the banding is spiral-wound in the opposite direction to the T-section wires 3 and the U-section wires 4 of the arch. Lengthwise, the U-section wire 4 may be covered either by two wires 15A and 15B of the banding when two parallel wires are spiral-wound, or by two adjacent turns 15A and 15B of the banding wire when a single wire is spiral-wound, as shown in FIG. 5A, or else by a wire such as 15B, as shown in FIG. 5B. In particular, in the situation illustrated in FIG. 5B, it has been found that a small value for the radial distance b is sufficient to prevent the banding wire, such as 15B in FIG. 5B, from bearing against the U-section wire 4, and to increase the bearing force between the U-section wire and the T-section wire, which would have damaging consequences for the strength and the lifetime of the pressure arch.

The values of the heights G and M are each preferably greater than or equal to 0.5 mm, and in particular greater than 1 mm.

The width C is preferably greater than or equal to 1 mm, and may typically be 2 mm to 3 mm.

In the embodiment of FIG. 3, the radius R is preferably greater than or equal to 0.5 mm, and in particular greater than or equal to 1 mm.

The ratio of the values of A and B preferably lies between 1.25 and 2, and in particular between 1.45 and 1.65.

In the axial direction of the flexible tubular hose, the following preferably apply:

D+H≦B, and

I−2J<5 mm and preferably less than 2.5 mm, and preferably 1.2 mm≦B−L≦2.5 mm.

Preferably, since the inner surface 14 of the groove of the U-section wire 4 is plane, the height of the U-section wire 4 in its central portion is greater than or equal to 1 mm, advantageously greater than or equal to 2 mm, beneficial results being obtained with a height between 2 mm and 3 mm.

Examples of Prototypes Tested

|  | Examples according to the invention | | Comparative example |
| --- | --- | --- | --- |
|  | Prototype 1 | Prototype 2 | Prototype 3 |
| Flexible hose | | | |
| Internal diameter | 6" (152.4 mm) | 10" (254 mm) | 6" (152.4 mm) |
| Maximum internal pressure | 370 bars | 425 bars | 281 bars |
| Pressure arch T-section wire | | | |
| Height A | 14 mm | 14 mm | 10 mm |
| Weight B | 25 mm | 25 mm | 19.4 mm |

-continued

|  | Examples according to the invention | | Comparative example |
| --- | --- | --- | --- |
|  | Prototype 1 | Prototype 2 | Prototype 3 |
| Height of ribs F | 11 mm | 11 mm | 8 mm |
| Material | Carbon steel $R_m$ = 722 MPa | Carbon steel $R_m$ = 850 MPa | Carbon steel $R_m$ = 877 MPa HV hardness (20 kg) = 270 to 320 |
| U-section wire | | | |
| Central height E | 2.9 mm | 2.3 mm | 1.8 mm |
| Width D | 17.8 mm | 17.6 mm | 13.2 mm |
| Height of ribs G | 1.9 mm | 1.9 mm | 2.5 mm |
| Material | Carbon steel $R_m$ = 860 MPa | Carbon steel $R_m$ = 860 MPa | Carbon steel HV hardness (20 kg) = 90 to 120 |
| Radial clearances | | | |
| 1) Radial bearing force between lateral ribs of T-section wire and central span of U-section wire | | | |
| 2) Radial clearance c between ribs of U-section wire and grooves of T-section wire | 0.3 mm to 0.5 mm | 0.3 mm to 0.5 mm | 0 |
| 3) Overhang b of the central rib of the T-section wire relative to the outside surface of the U-section wire | nominal = 0.1 mm actual | nominal = 0.7 mm actual (tolerances on wire dimensions, U-section wire overhanging slightly) | 0.2 mm |
| Supplementary pressure arch | | | |
| Wire thickness | None | 7.5 mm | None |

Test Results

Prototype 1

Internal pressure maintained at 369 bars.

Axial tension equal to 793 kN.

Dynamic conditions (angular offset imposed on hose, varying cyclically) corresponding to typical conditions for the North Sea (very severe) for 20 years. The flexible hose withstood a number of cycles corresponding to a lifetime of 20 years. Examination of the wires shows a small amount of wear, that was even and without cracking.

Prototype 2

Internal pressure maintained at 425 bars.

Axial tension equal to 800 kN.

As for Prototype 1, dynamic conditions corresponding to the North Sea over a period of 20 years. Excellent results, confirmed by examination of the wires, as for Prototype 1.

Prototype 3

Internal pressure=277 bars.

Axial tension=850 kN.

Dynamic conditions corresponding, as for the other two prototypes, to the North Sea over a duration of 20 years. The T-section wire broke shortly before the end of the 20-year design limit, giving rise to a leak and making the flexible hose unusable.

The unsatisfactory result of Prototype 3 can be explained by the fact that contact took place in two locations in each overlap zone, both on the ribs of the U-section wire and on the ribs of the T-section wire, with this being made worse by the fact that the steel of the U-section wire was much too soft relative to the T-section wire.

In general, the T- and U-section wires can be made of any kind of metal, steel or other metals, that are suitable for use as flexible hose reinforcement. In particular, it is possible to use the same metal for both wires, using the same grade, or grades that are similar.

In the typical case of carbon steel wires, the ultimate tensile strength Rm of the U-section wire is preferably greater than a value equal to the ultimate tensile strength Rm of the T-section wire minus 200 MPa:

$$Rm_U \geq Rm_T - 200 \text{ MPa}$$

and advantageously 100 MPa to 200 MPa greater than the value Rm of the T-section wire:

$$Rm_U = Rm_T + (100 \text{ to } 200) \text{ MPa}$$

Although the invention is described above with reference to particular embodiments, it is clearly not limited in any way thereto and diverse variants and modifications may be applied thereto without thereby going beyond its ambit as defined by the claims.

What is claimed is:

1. A flexible hose for transporting fluids under pressure, comprising:

the hose having an axis;

an internal leakproof sheath;

pressure-resistant armoring, helically wound around said sheath and about said axis and substantially orthogonal to said axis, said pressure-resistant armoring, including:

a T-section wire including a first base with first lateral extremities, a central rib extending up from said first base and first lateral ribs extending up from said first lateral extremities of said first base, wherein said central rib extends farther from said first base than said first lateral ribs, each said first lateral rib and said central rib defining a respective first groove;

a U-section wire including a second base with second lateral extremities, second lateral ribs at said second lateral extremities of said second base, defining a second groove between said second ribs;

said first lateral ribs and said central rib of said T-section wire extend radially outwardly and said second lateral ribs of said U-section wire extend radially inwardly toward said axis;

said T-section and U-section wires being interconnected such that one of said second lateral ribs of said U-section wire is received in an adjacent one of said first grooves of one winding of said T-section wire and the other of said second lateral ribs is received in an adjacent one of said first grooves of a next winding of said T-section wire;

one of said first lateral ribs of said T-section wire is received in an adjacent said second groove of one winding of said U-section wire and the other of said first lateral ribs is received in an adjacent said second groove of a next winding of said U-section wire;

said lateral ribs being of such lengths and being so placed that one of said first and second lateral ribs of one of said T-section wire and said U-section wire extends into a respective one of the said grooves of and contacts said base of the other of said T-section wire and said U-section wire; and the other one of said first and second lateral ribs of the other one of said T-section wire and said U-section wire extends into a respective one of the said grooves of the one of said T-section wire and said U-section wire and said other lateral ribs are of a length to define a radial clearance between said other lateral ribs and said base of the said one of said T-section wire and said U-section wire.

2. The hose of claim 1, wherein said lateral ribs of said one of said T-section wire or U-section wire are longer in the radial direction than said lateral ribs of said other of said T-section wire or U-section wire.

3. The hose of claim 2, wherein said one of said lateral ribs are said first lateral ribs and said other of said lateral ribs are said second lateral ribs.

4. The hose of claim 1, further comprising the cross-sectional area of said T-section wire is substantially greater than the cross-sectional area of said U-section wire.

5. The hose of claim 4, wherein said cross-sectional area of said T-section wire and said cross-sectional area of said U-section wire are in a ratio of at least 2.

6. The hose of claim 5, wherein the ratio is at least 3.

7. The hose of claim 1, further comprising tension armoring, including at least two crossed layers of wires, disposed on said pressure-resistant armoring; and an outer protective sheath, disposed around said tension armoring.

* * * * *